United States Patent [19]

Polhäll et al.

[11] 4,080,859
[45] Mar. 28, 1978

[54] SHEARS FOR CROPPING WIRE, MOVING AT HIGH SPEED

[75] Inventors: Karl-Olof Adolf Polhäll, Smedjebacken; Arne Johnsen, Ludvika, both of Sweden

[73] Assignee: Morgardshammar Aktiebolag, Smedjebacken, Sweden

[21] Appl. No.: 681,569

[22] Filed: Apr. 29, 1976

[30] Foreign Application Priority Data

Apr. 29, 1975 Sweden .............................. 7504972

[51] Int. Cl.² ............................................. B26D 1/56
[52] U.S. Cl. ........................................ 83/306; 83/497
[58] Field of Search ................ 83/306, 307, 345, 497, 83/500, 105; 144/136 R

[56] References Cited

U.S. PATENT DOCUMENTS

| | | | |
|---|---|---|---|
| 2,223,497 | 12/1940 | Purser et al. ...................... | 83/500 X |
| 2,701,016 | 2/1955 | Bedson .................................. | 83/105 |
| 3,312,135 | 4/1967 | Mraz .................................... | 83/500 X |
| 3,491,640 | 1/1970 | Poran .................................... | 83/306 |
| 3,496,812 | 2/1970 | White et al. ...................... | 83/500 X |
| 3,672,415 | 6/1972 | Holan ................................. | 144/136 R |
| 3,727,498 | 4/1973 | Poran .................................... | 83/306 X |
| 3,760,670 | 9/1973 | Foran .................................... | 83/306 X |

FOREIGN PATENT DOCUMENTS 1,397,353  3/1964  France .................................. 83/497

*Primary Examiner*—Othell M. Simpson
*Assistant Examiner*—Horace M. Culver
*Attorney, Agent, or Firm*—Young & Thompson

[57] ABSTRACT

Shears, for cropping wire, and including on the one hand, two rotating cutting bodies overlapping to shear the wire, in the form of cylindrical discs whose planes form a right angle with one another, and on the other hand, means for achieving relative motion of the wire and the shearing discs to perform said cropping, a small portion of the circumferential surface of one of the discs being covered by a small portion of one side surface of the other disc where the two discs overlap for cropping the wire.

4 Claims, 8 Drawing Figures

U.S. Patent     March 28, 1978     4,080,859
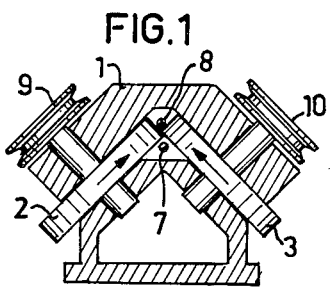
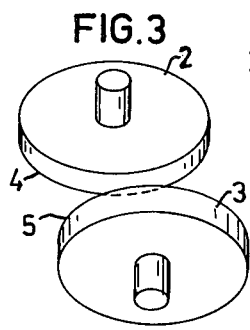
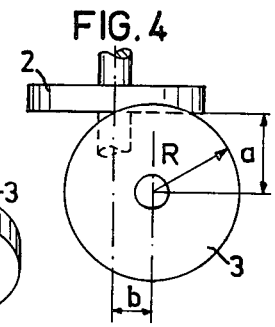
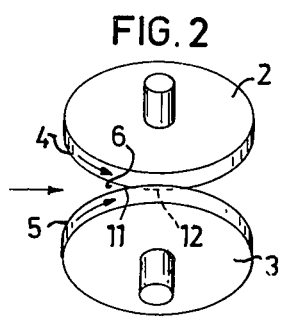
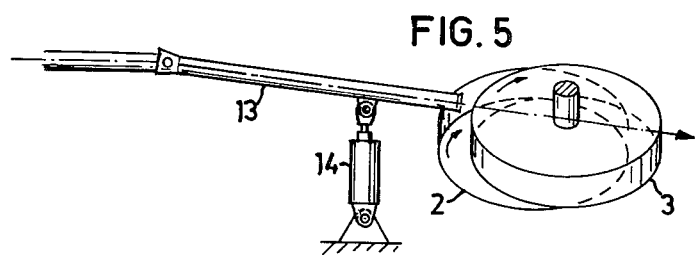
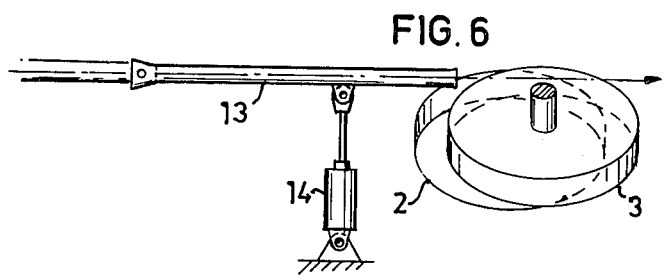
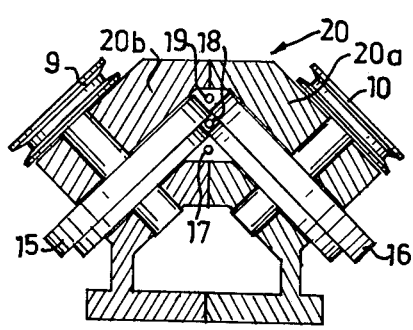
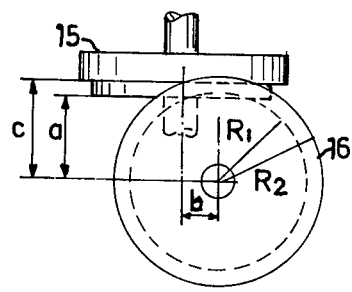

SHEARS FOR CROPPING WIRE, MOVING AT HIGH SPEED

The forward and rear ends of a rolled wire have imperfections and must therefore be cropped before they are shipped from the mill. This cropping or clipping is difficult and time-consuming once the wire has been coiled. Therefore the clipping or cropping is done instead between the last pair of rollers and the reel. It is also desirable to clip off a sample from each charge for quality control. In addition to round sections oval and rectangular sections are also cropped.

The so-called flying shears used up to now for cropping, cannot be constructed for higher rolling speeds than about 20 m/s due to the mass forces occurring at higher speeds in the necessarily rather heavy movable parts of the apparatus. Continuously rotating disc shears can, it is true, be used at rolling speeds up to 30–35 m/s, but at still higher speeds these shears have the disadvantage that the required lateral movement of the wire can even result in the wire jamming in the guide tubes.

The present invention has the purpose of providing a shears for cropping rolled wire, running at current rolling speeds and those to be considered in the forseeable future, said shears working with the smallest possible altering of the path of the wire and allowing the wire immediately after cropping to continue on its new path.

A shears is previously known for cropping running rolled metal, comprising, on the one hand, two rotating cutting bodies overlapping for clipping off the rolled metal, in the form of circular discs comprising shearing discs, whose planes form an angle with one another, and on the other hand means for effecting the relative motion of the rolled metal and the shearing discs to perform the cropping. A shears is proposed according to the invention, to achieve the goal described, which is primarily characterized in that the angle between the planes of the shearing discs is a right angle, and that a small portion of the circumferential surface of one disc is covered by a small portion of the side surface of the other disc, where the two discs overlap for cropping the rolled metal. The expression "where the two discs overlap" should be understood to mean that the two shear discs do not necessarily need to be in direct contact with one another. Even a small space between the two discs will result in a clipping off of the running rolled metal. In an especially suitable embodiment of a shears according to the invention the axes of rotation of the two shearing discs are displaced in the direction of the motion of the rolled metal through the shears. This displacement reduces the stresses on the shafts and bearings of the discs.

The shearing discs themselves can be constructed in many different ways. However, the simplest and most dependable form for them is the cylindrical form. By having each of the shearing discs in the form of several coaxial cylinders disposed as terraces on top of one another, a number of places of overlap between the two shearing discs can be provided in the same shears. In a shears constructed according to the invention, in which, for example, the shearing discs are made with three ledges, there is the advantage that by merely stopping the movement of a change-over tube after the first or the second clip, the front and rear ends can be cropped and a sample can be taken out of the rolled metal running through the shears.

To assure correct cropping, the shearing discs in a cropping shears constructed according to the invention should rotate with a circumferential speed which is higher than the speed of the rolled metal through the shears.

The shear discs can be arranged on stands, which are movable in relation to one another on either side of the path of the rolled metal. In a shears constructed in this way according to the invention, after the separation of the shearing discs with the help of the movable stands, the whole shears can be raised or lowered in relation to the path of the rolled metal without the shearing discs coming into contact with the rolled metal. If an embodiment of this type for the shears according to the invention is provided with shearing discs with two ledges, the cropping as well as the taking of a sample at both the beginning and the end of the rolled metal can be performed. After cropping and the taking of a sample at the front end the moveable stands are separated and the whole shears is returned vertically to its original position whereupon the stands are again moved together and the shears is again ready for taking a sample from and cropping the rear end.

The invention will be described in the following in more detail with reference to several schematic embodiments shown in the accompanying drawing.

FIG. 1 shows a section through a first embodiment for a cropping shears according to the invention, FIG. 2 a view from above of the shearing discs in the shears, FIG. 3 is a view corresponding to FIG. 2 of the shearing discs in a second embodiment of the cropping shears according to the invention, whose axes of rotation are in two parallel planes, FIG. 4 a view of the two shearing discs in FIG. 3 viewed at a right angle to the plane of one of the discs, FIG. 5 a schematic side view of the two shearing discs in FIGS. 3 and 4, shown in combination with a change-over tube arrangement in its end position for determining the direction of motion of the rolled metal through the shears, FIG. 6 a view corresponding to that in FIG. 5 with the change-over tube arrangement in its other end position, FIG. 7 a view corresponding to FIG. 1 of a third embodiment for a cropping shears according to the invention, in which shearing discs made in ledges are arranged in stands, which are movable in relation to each other on either side of the path of the rolled metal, and FIG. 8 shows finally in a view corresponding to FIG. 4 the two shearing discs in the shears according to FIG. 7.

As is evident from the drawings a shears according to the invention, which is intended for cropping of rolled wire, running at high speed, contains on the one hand two rotating cutting bodies in the form of circular discs 2,3; 15,16 overlapping for cutting the rolled wire, and on the other hand means, for example in the form of a change-over tube 13 operated by means of a pressure cylinder 14, for the relative motion of the rolled metal and the shearing discs to perform the cropping. Instead of the means shown here for effecting the relative motion, a stand 1,20 with the axles of the shearing discs journalled in it, can be of course moved the required distance in relation to the rolled metal.

As is especially evident from FIGS. 1 and 7, the shearing discs 2,3; 15,16 in a shears according to the invention, are driven for example by means of V-belts, which is evident from said Figures by the V-belt discs 9,10 connected to the axles of the shearing discs.

From the various figures it is also evident that the shear discs 2,3; 15,16 in a cropping shears according to the invention are placed at a 90° angle to one another so that the angle between the planes of the discs is a right angle.

It is also evident from the Figures that a small part of the circumferential surface of one of the discs 2,15 covers a small portion of one side surface of the other disc 3,16, where the two discs overlap for cropping the rolled wire. The two shearing discs should be adjusted axially so that they overlap with very little clearance.

The driving of the shearing discs should be such that their peripheral speed is greater than the running speed of the rolled wire to be cropped.

In the embodiment shown in FIG. 1, rolled wire 7 runs untouched directly under the place where the two shearing discs 2,3 overlap. When the wire 7 is guided, for example with the help of a change-over tube 13 and a pressure cylinder 14 over to the position marked 8 in FIG. 1, the wire will be clipped off at the point of overlap between the shearing discs. Another clipping or cropping occurs when the wire, when returned to position 7 with the help of the change-over tube 13, again passes the point of overlap between the shearing discs.

As is especially evident from FIG. 2 the edges 4,5 of the shearing discs 2,3 in a shears according to the invention shown in FIG. 1, form a V-shaped entrance to the cutting point 6. It is into this V-shaped entrance that the rolled wire is guided and gripped by the discs for clipping.

The risk of disadvantageous stresses on the axles and bearings of the discs is reduced if the axes of rotation of the two shearing discs as shown in FIGS. 3 and 4 are placed in different but parallel planes. The axes of rotation of the two shearing discs will thereby be relatively displaced along the path of the rolled metal through the shears. The facing edges 4,5 of the shearing discs 2,3 will meet if the following conditions are met:

$$b = \sqrt{R^2 - a^2}$$

where
$b =$ the distance between the two parallel planes
$R =$ the radius of the shearing discs, and
$a =$ the distance between the center of rotation of one disc 3 and the near side of th other disc 2.

FIGS. 5 and 6 show how the rolled wire is guided by means of the change-over tube 13 under the shearing discs 2,3, before being clipped and FIG. 6 shows how the rolled wire after being clipped runs out above the shearing discs.

FIG. 7 shows an embodiment of a shears according to the invention which makes possible at least two clips. Two shearing discs 15,16 are journalled in the stand 20 and are disposed at 90° to one another. Each disc consists of two cylindrical parts of different radii, with the parts with the same radii facing each other.

When the rolled wire 17 is moved from the position designated by 17 to the position designated by 18, the rolled wire is sheared. The next shearing occurs when the rolled wire is moved further from position 18 to the position designated 19. If the wire is moved between the various positions with the help of a change-over tube 13, the tube's movement can be halted when the wire is in the position designated by 18, and the shears can then be used to first crop the front-end and then the rear-end of the wire when the stroke of the change-over tube is completed. If on the other hand the change-over tube 13 is moved directly from position 17 to position 19 cropping as well as sampling is achieved.

If the shearing discs are constructed in this same manner but with three ledges a shears is produced which is capable of cropping the front and rear ends as well as taking a sample merely by halting the movement of the change-over tube after the first or second shearing. Due to the fact that the embodiment of the shears according to the invention shown in FIG. 7 has its shearing discs 15,16 mounted in stands 20a, 20b which are moveable in relation to each other on either side of the path of the wire, it is capable of performing cropping and sampling both at the forward and at the rear end of the wire. After cropping and sampling at the forward end of the wire, the stand halves 20a, 20b can be separated, so that the whole shears can be lifted over the position designated by 19, whereafter the stands are moved together and the shears is ready in the position designated by 17 for sampling and cropping of the rear end. All of these separating, lifting and putting-together movements can be done automatically with the help of simple, for example hydraulic or pneumatic, auxiliary means.

In order that there be two shearing locations between the two discs 15,16 in the shears shown in FIG. 7 three conditions must be fulfilled:

Firstly, the length of the cylinder of smaller radius on the one disc 16 must be equal to the difference between the larger and smaller radii of the other disc 15.

Secondly, the following relation must hold:

$$b = \sqrt{R_1^2 - a^2}$$

where
$b =$ the distance between the two planes of the axes of rotation of the discs,
$R_1 =$ the radius of the smaller cylinder of the one disc 16,
$a =$ the shortest distance between the axis of rotation of the one disc 16 and the near side of the other disc 15.

Thirdly, that $$R_2 = \sqrt{c^2 + b^2}$$

where
$R_2 =$ is the largest radius of one of the discs,
$c =$ the distance between the axis of rotation of the one disc 16 and the near side of the other disc 15 with the larger radius, and
$b =$ the distance between the parallel planes in which the axes of rotation of the two discs 15,16 lie.

The invention is not limited to the embodiments described here and shown in the drawing. Rather it can be modified in many ways within the scope of the claims.

We claim:

1. Shears for cropping wire running at high speed, comprising two rotating cutting bodies overlapping to shear the wire, each cutting body comprising a cylindrical disc having side surfaces at least one of which is radially disposed and a circumferential surface that interconnects said side surfaces, said discs being disposed at a ninety degree angle to each other, a small portion of said at least one radial side surface of one disc overlapping a small portion of said circumferential surface of the other said disc whereby the two discs overlap for cropping the wire, and means to move the wire and the discs relative to each other in a direction transverse to the wire thereby to move the wire toward the region of said overlapping so as to crop the wire.

2. Shears according to claim 1, characterized in that the axes of rotation of the two shearing discs are relatively displaced in the direction which the wire moves through the shears.

3. Shears according to claim 1, characterized in that each of the shearing discs has the form of a plurality of coaxial cylinders arranged as terraces on top of one another.

4. Shears according to claim 1, characterized in that the shearing discs are arranged on stands which are moveable in relation to each other on either side of the path of the wire.

* * * * *